Sept. 29, 1931.  C. FLOYD  1,825,629
MACHINE FOR DIVIDING FRUIT
Filed June 18, 1930  4 Sheets-Sheet 1

Inventor
Carol Floyd
by *O. W. Harrison*
Attorney

Sept. 29, 1931.  C. FLOYD  1,825,629
MACHINE FOR DIVIDING FRUIT
Filed June 18, 1930  4 Sheets-Sheet 2

Inventor
Carol Floyd
by N. W. Harrison
Attorney

Sept. 29, 1931.  C. FLOYD  1,825,629
MACHINE FOR DIVIDING FRUIT
Filed June 18, 1930  4 Sheets-Sheet 3

Inventor
Carol Floyd
by  Attorney

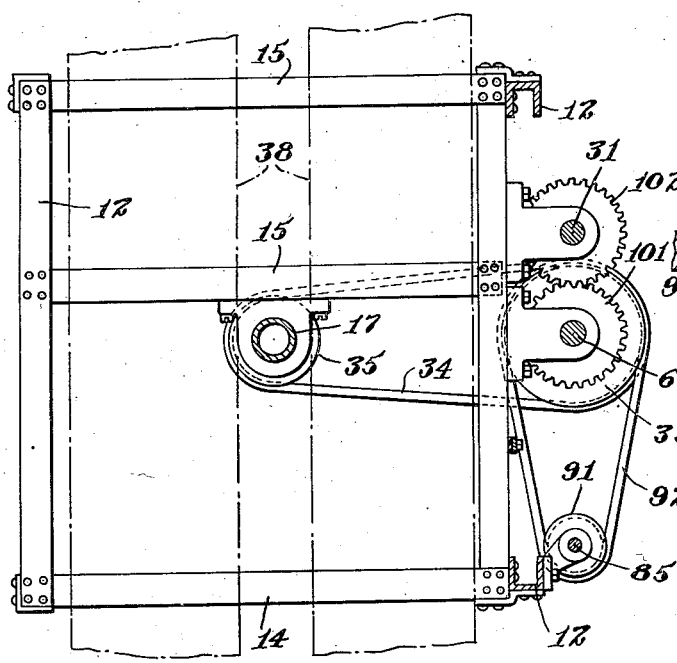
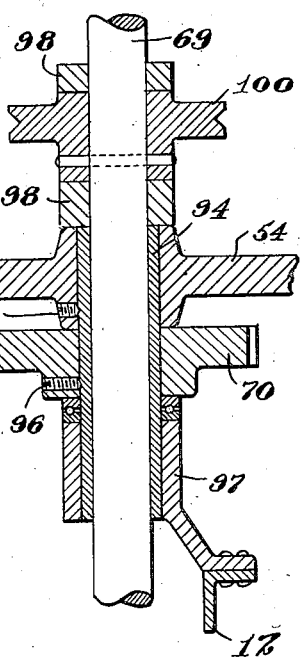
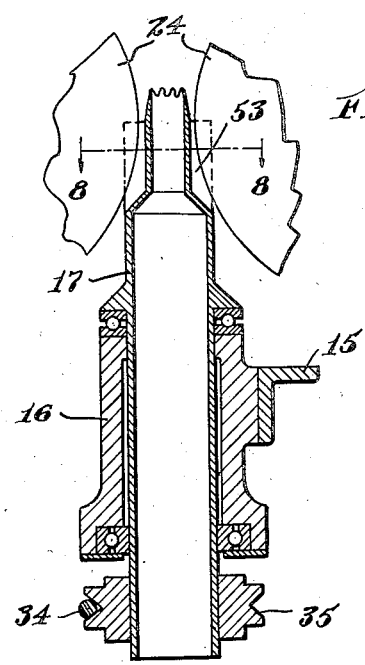
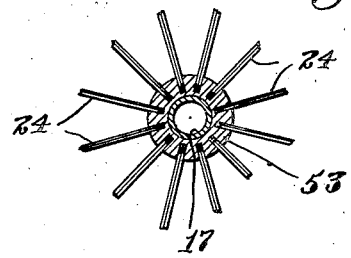
Inventor
Carol Floyd
by A. W. Harrison
Attorney Patented Sept. 29, 1931

1,825,629

UNITED STATES PATENT OFFICE

CAROL FLOYD, OF ORLANDO, FLORIDA, ASSIGNOR TO DR. P. PHILLIPS COMPANY, OF ORLANDO, FLORIDA, A CORPORATION OF FLORIDA

MACHINE FOR DIVIDING FRUIT

Application filed June 18, 1930. Serial No. 461,899.

This invention relates to the preparation of fruit, especially citrous fruit, for use in preserved condition in containers such as cans, and has particular reference to the coring and slicing of the fruit after the peel or skin of the fruit has been removed.

As explained in Letters Patent No. 1,759,464 issued May 20, 1930, to Philip Phillips, it is desirable that the fruit prepared for canning shall be so cut that the segments of the fruit will be divided into pieces that consist not of the pulp alone but of pulp and pieces of the membranes adhering together. A machine for effecting such dividing of the fruit is illustrated and described in the application Serial No. 401,061, filed October 21, 1929, by Carol Floyd and Daniel M. Smalle, said machine having a plurality of knives and means for positioning the fruit relatively to the knives to effect severing of the segments of the fruit into pieces including both pulp and membrane. In that machine the slicing was effected only radially inward toward the core or axis of the fruit, and coring effected simultaneously therewith.

One of the objects of the present invention is to provide a machine which not only effects such slicing and coring as is done by the machine of the application referred to, but also effects bi-secting to cut the fruit in a manner similar to slicing the fruit in halves when preparing it for table use, the combined effects of such bi-secting and radial slicing being to prepare the fruit in what may be termed half plugs or tid-bits.

Another object of the present invention is to provide a machine which will automatically present a succession of fruits to the cutters which bi-sect and radially slice the same.

With the above-mentioned objects in view, and others hereinafter referred to, the invention consists in the construction and combination of parts substantially as hereinafter described and claimed.

Of the accompanying drawings:—

Figure 5 is a detail sectional view on line 5—5 of Figure 1.

Figure 6 is a detail sectional view on line 6—6 of Figure 2, on a larger scale.

Figure 7 is a detail sectional view on line 7—7 of Figure 1, on a larger scale.

Figure 8 represents a section on line 8—8 of Figure 7.

Figure 9 represents a section on line 9—9 of Figure 2, on a larger scale.

Figure 10 represents a section on line 10—10 of Figures 2 and 4, on a larger scale.

Similar reference characters indicate similar parts or features in all of the views.

Figure 1:
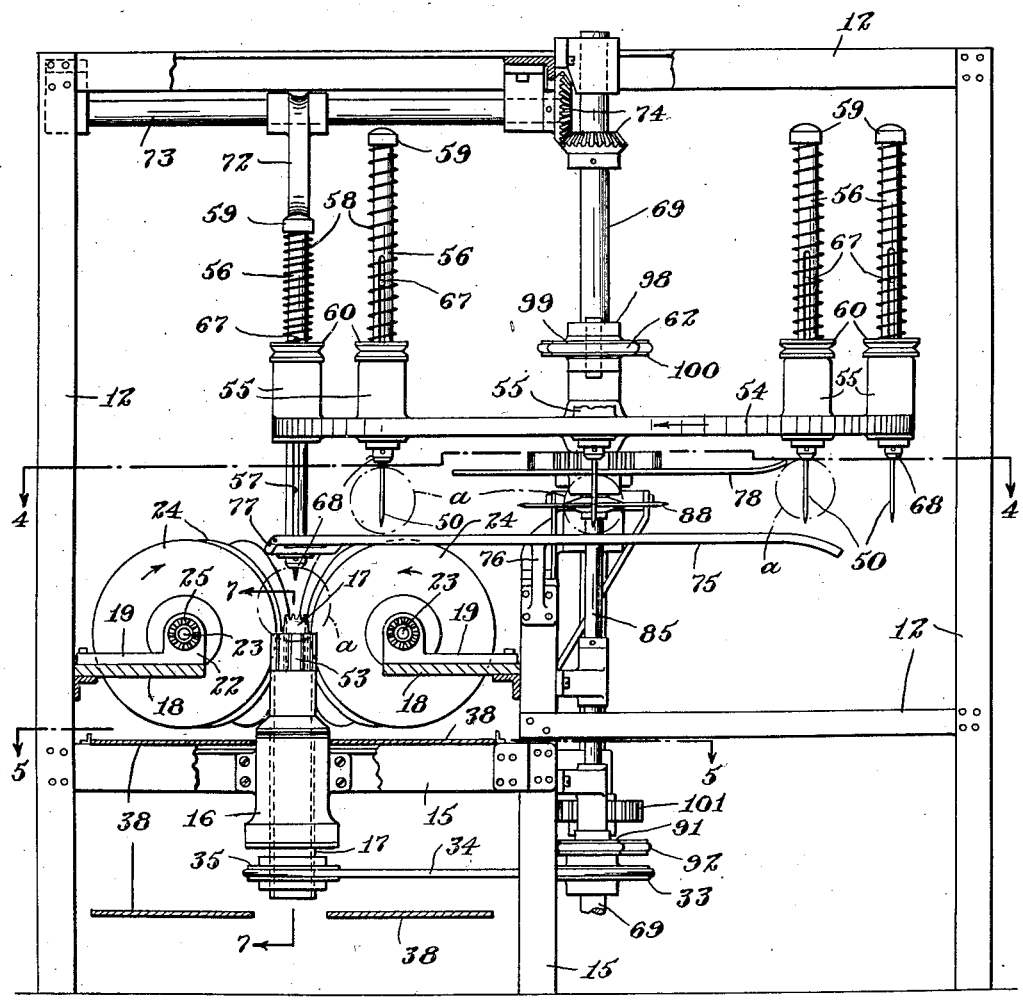
Figures 1 and 2 are side elevations of the machine, from different points of view, and some of the fruit-carrying impalers omitted to avoid unnecessary illustration.

Reference will be made first to the portions of the machine which are the same as, or closely similar to, the machine illustrated and described in the application Serial No. 401,061 hereinbefore referred to. And for convenience, said similar portions are indicated by the same reference numerals as employed in said application.

Figure 3:
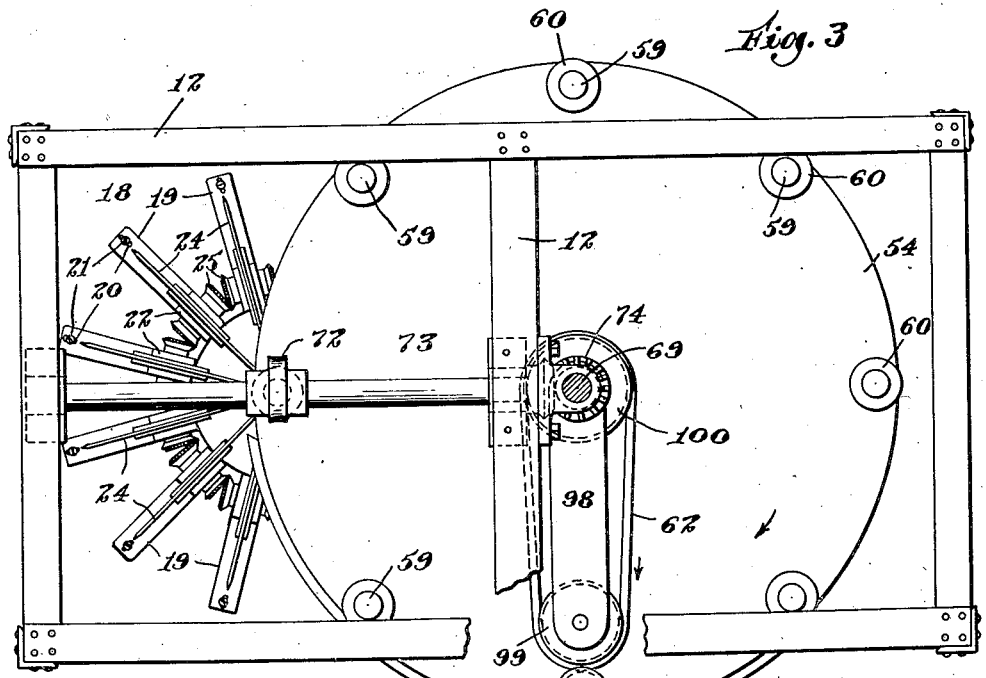
Figure 3 is a top plan view in which the entire set of eight impalers are indicated.

A suitable frame for the machine is illustrated at 12, the side members of the frame being connected by one or more cross bars 15 which support a vertical bearing 16 for a tubular corer 17. The upper end of the corer is preferably somewhat contracted and the upper edge thereof serrated or toothed. Also supported by the frame is a shelf 18 having a central aperture (Fig. 3). Radially mounted on the said shelf, around its aperture, are a plurality of strips 19 slotted as at 20, screws 21 passing through the slots into the shelf whereby said strips may be adjustably secured in a radial direction.

Figure 4:
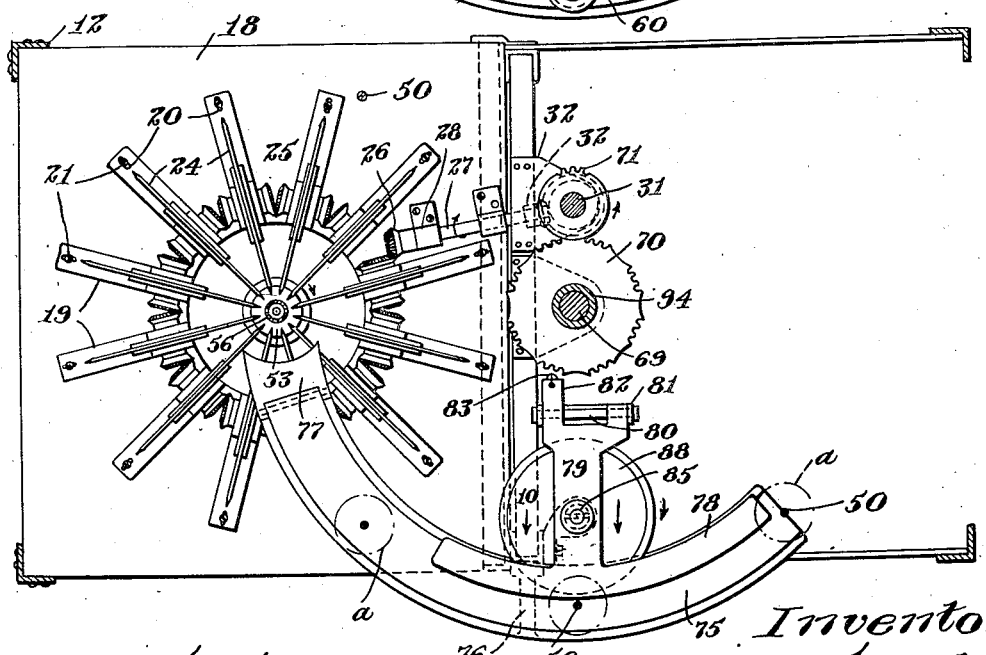
Figure 4 represents a section on line 4—4 of Figure 1.

Each strip 19 carries a bearing 22 for the shaft 23 of a circular slicing knife 24, the several shafts having intermeshing bevel gears 25. Meshing with one of the gears 25 is a bevel gear 26 (Fig. 4) carried by the inner end of a shaft 27 mounted in a bearing 28 supported by the shelf 18, said shaft having a bevel gear connection 30 with a vertical shaft 31 mounted in bearings provided in frame brackets 32.

A pulley 33 carried by a shaft 69 hereinafter described, is connected by a belt 34 (Figs. 1 and 5) with a pulley 35 connected to the lower end of the corer 17 below its bearing 16, the relative sizes of the two pulleys being preferably such that the corer is rotated at a much higher speed than the speed of rotation of the knives 24 which latter are arranged radially in a circular series surrounding the corer.

Reference will now be made to the present improvements:—

Mounted loosely on the corer 17 (Figs. 1, 4, 7 and 8) is a bushing or collar 53 having as many external vertical slots or recesses as there are knives 24, the edges of the knives entering said slots and therefore holding the bushing stationary although the corer 17 revolves therein. The purpose of this structure is to effect a clear cutting of the fruit by the cooperation of the knife edges with the sides of the slots in the bushing when the machine is in operation as hereinafter described.

Figure 2:
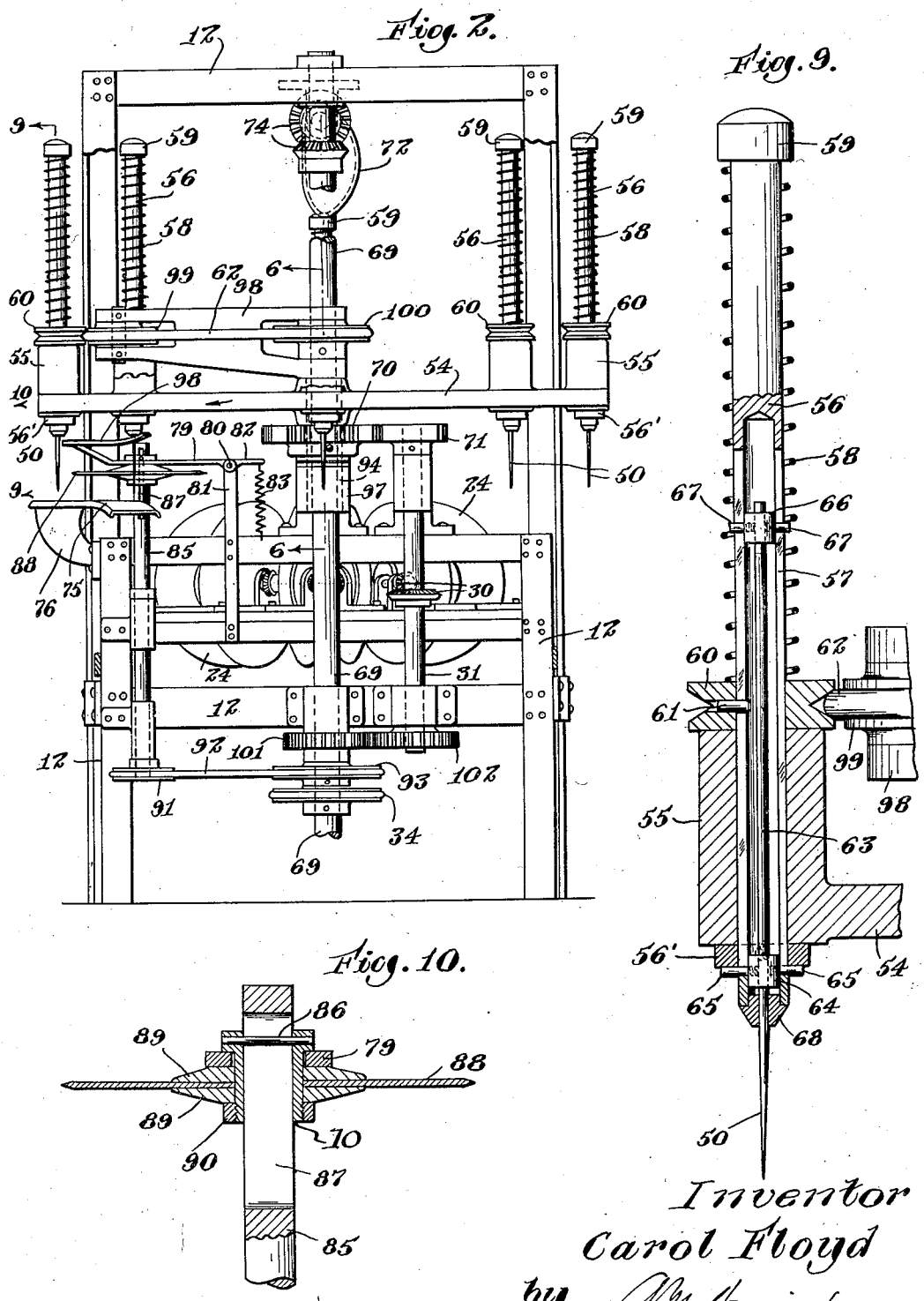

In the present machine, instead of a single impaler or needle as in the application referred to, I provide a plurality such as eight, all carried by an intermittently rotatable turret disk 54 having marginal vertical bearings 55 (Figs. 1, 2 and 3). Vertically movable in each bearing 55 is a tube 56 (Fig. 9) which is slotted as at 57. A spring 58 coiled around each tube is confined between a collar 59 at the top of the tube and the upper surface of a pulley 60 which rests on the top of the bearing 55, said pulley having a pin or screw 61 extending into one of the slots 57. Therefore, although the tube is slidable in the pulley, it will be rotated by the pulley when the latter is being acted upon by the belt 62 hereinafter described.

Each impaler has a long shank 63 in a tube 56 and is provided with two blocks slidable in said tube. The lower block 64 is secured to the shank 63 by two screw pins 65 which also extend out through the slots 57 of the tube, and the upper block 66 is secured to said shank by two screw pins 67 which also extend out through the slots 57 of the tube. Mounted in the lower end of each tube is a plug 68 through which the impaler projects. A collar 56' is secured to each tube 56 near its lower end, as by a screw indicated by dotted lines in Figure 9.

The turret disk 54 is mounted on and carried by a sleeve 94 (Fig. 6) which will be presently described, said sleeve being mounted on a vertical shaft 69 and having secured to it one member 70 (Fig. 4) of an intermittent or "Geneva" type of gearing the other member 71 of which is carried by the shaft 31. This gearing, and other gearing to be described, is such as to effect a temporary stoppage of the turret each time that an impaler arrives over and in alinement with the corer. During such stoppage the impaler that is so alined is depressed by a cam 72 (Figs. 1, 2 and 3) acting on the top collar 59 of the tube of such impaler, said cam being carried by a shaft 73 mounted in suitable overhead bearings and connected by bevel gearing 74 with the shaft 69.

Reference will now be made to the mechanism which ensures the bi-secting of each orange on its way to be radially cut by the knives 24. The intermittently rotatable disk or turret 54 moves in the direction of the arrows, Figs. 1, 2 and 3, and oranges are successively mounted by an attendant on the impalers when they are substantially at the opposite side of the machine from the location of the corer and radial knives. Each orange being then carried around by an impaler rides between lower and upper guides. The lower fixed guide or shelf 75 (Figs. 1, 2 and 4) is supported by a bracket 76 secured to a frame member, and at its delivery end has a flap 77 hingedly connected to it and preferably maintained in a downwardly inclined direction by a suitable spring not necessary to illustrate. The other or receiving end of the shelf is illustrated in Figures 1 and 2 as bent slightly downwardly.

The upper guide 78 is shorter than the lower guide 75 and of less width so that each impaler will pass by its outer edge. The shank 79 of said upper guide is pivoted at 80 to a fixed upright 81 and has a short arm 82 to which a spring 83 is connected for a purpose presently explained.

The said shank 79 (compare Figs. 2 and 10) has a hole through which a bushing 84 passes, said bushing being vertically slidable on a shaft 85 and having a cross pin 86 traversing a vertical slot 87 in said shaft. A circular cutter 88, which may have a knife edge or fine saw teeth, is secured to the bushing between washers 89 clamped by a nut 90 on the lower end of the bushing. The lower end of the shaft 85 has a pulley 91 connected by a belt 92 with a pulley 93 carried by shaft 69. The parts of the machine are so proportioned, and the timing due to the gearing, is such that the intermittent rotatable turret stops when one orange arrives opposite the cutter 88 and another orange arrives over the corer.

The object of the mechanism just described is to enable each orange, on its way to the corer and radial knives, to be horizontally cut into by the cutter 88 at practically its center regardless of its diameter. Normally the bi-secting cutter 88 occupies a lower position, its weight and the weight of its directly associated members being partially counterbalanced by the spring 83 (Fig. 2). The diameter of the cutter 88, and its distance to the path of travel of the impalers, is such that the bi-secting cut is made to a depth of about one-half inch from the impaler which, in operation, is in the core of the orange. If the orange is of such size that as it is moved by its impaler along the lower fixed guide 75, its upper surface acts on the upper guide 78 to lift the latter, the cutter 88 is also lifted. But since the described connection between the cutter-carrying bushing 84 and the shank 79 of the said upper guide is about one-half of the distance between the operating edge of the cutter and the pivot 80 of said shank, the cutter will be lifted to approximately one-half the diameter of the orange. No matter how high the bi-secting cutter is lifted, it is rotated continuously owing to the cross pin 86 (Fig. 10) traversing the vertical slot 87 in the rotating shaft 85.

Reference has been made to a sleeve on the shaft 69, which sleeve carries one member 70 of the gearing which imparts step-by-step rotation to the impaler turret. Said sleeve is illustrated at 94 in Figure 6, means such as a screw 95 being employed to secure the hub of the disk 54 to said sleeve. The gearing member 70 also is secured to the sleeve as by a screw 96. Said sleeve, through which the shaft 69 extends, is mounted in a bearing 97 supported by a portion of the frame 12.

Mounted on the shaft 69, above the sleeve 94, is an arm 98 (Figs. 1, 2, 3 and 6) having a pulley 99 at its outer end. Pinned to the shaft 69 in the yoke-shaped space of said arm, is a pulley 100. The belt 62 is mounted on the two pulleys 99, 100. Any suitable means not necessary to illustrate are employed to maintain the arm 98 in the position illustrated in Figures 2 and 3 so that when an impaler brings an orange to position to be bi-sected, the contact of the pulley 60 (there being one keyed to each impaler tube by its pin 61 entering the tube slot 57) with the portion of the belt running around the pulley 99, will cause the impaler and the orange thereon to rotate during the period of stopping at that point, and so effect complete bi-secting of the orange nearly to its core.

Assuming that a suitable motor drives the shaft 69 by means of a pulley or gear connected to the lower end thereof, power is transmitted therefrom to the shaft 31 by means of a gear 101 carried by the shaft 69 (Figs. 1, 2 and 5), said gear meshing with a gear 102 carried by the shaft 31.

In the operation of the machine as a whole, an attendant takes oranges that have been previously peeled or skinned, and applies them successively to the impalers 50, preferably while the turret is stationary, and using care to have each impaler occupy the axis or core of the fruit; that is, through the center and between the meeting edges of the segments thereof. I do not limit myself, however, to such specific mounting of the fruits on the impalers, but it is preferable when oranges are to be so divided by the machine as to produce half plugs or tid-bits.

Each impaled orange passes along the lower guide 75 and is then temporarily arrested when it reaches the bi-secting cutter 88, having, as it rides along, acted on the upper guide 78 to effect the before-described operation of lifting the cutter if such orange be of a larger size than normal. At this point the impaler and the orange thereon are rotated by the contact of the impaler pulley 60 with the belt 62, so that the orange is completely bi-sected excepting the small core portion thereof. As the turret of impalers steps around, each bi-sected orange leaves the end of the lower guide or shelf and arrives over the corer 17 and again stops. At this instant, or practically so, the overhead cam 72 acts on the top collar 59 of that impaler tube 56 and thrusts it down, compressing its spring 58. The tube can slide down farther than the impaler 50. The latter moves down no farther than is permitted by contact of the pins 67 with the top of the pulley 60 (Figs. 1 and 9), thereby preventing the point of the impaler from being injured by contact with the rapidly rotating corer 17. But the tube is pushed farther down by the cam 72, the latter being of such shape and size as to cause the plug 68 at the lower end of the tube to force the fruit far enough down to ensure coring of the fruit and the conversion of the bi-sected segments into slices. The corings escape into any suitable receptacle below the lower end of the tubular corer, and the cut pieces of fruit drop onto the fruit delivering belts 38 onto which they may be guided by suitable inclined plates such as in the application Serial No. 401,061 referred to. During the downward movement of the fruit, the edges of the radial knives cooperate with the sides of the slots in the bushing 53 in effecting perfect clean shear cuts. When the cam 72 releases the depressed impaler, the spring 58 lifts the tube 56, and the lower ends of the slots 57 in the tube engage the pins 65 which project from the block 64 that is secured to the shank of the impaler, with the result that the impaler is returned to its normal upper position ready to travel around and have another orange applied thereto by the attendant.

In Figure 1 the dotted circles $a$ are to indicate several oranges on the impalers. I have mainly referred to oranges as the fruit operated upon. It is to be understood however, that I do not limit myself thereto, as the machine may be used for any kind of fruit or articles which it is desirable to similarly cut or divide.

Having now described my invention, I claim:—

1. A machine for dividing fruit, said machine having a rotary cutter for bi-secting the fruit, a group of radially arranged knives for dividing the fruit on lines crossing its bi-secting cut, a guideway from the bi-secting cutter to said radially arranged knives, means for effecting movement of the fruit along said guideway to position in line with the center of said knives, means for rotating the fruit while being bi-sected, and means for causing the bi-sected fruit to enter between said knives.

2. A machine for coring and slicing fruit, said machine having a rotary cutter for bi-secting the fruit, a group of radially arranged knives for dividing the fruit on lines crossing its bi-secting cut, a corer in the center of said group of knives, a guideway from the bi-secting cutter to said corer, means for effecting movement of the fruit along said guideway to position in line with said corer, means for rotating the fruit while being si-sected, and means for causing the bi-sected fruit to pass onto the corer and enter between said knives.

3. A machine for dividing fruit, said machine having a cutter for circumferentially effecting a cut in fruit, means for automatically controlling the relative positions of the cutter and fruit according to the size of the fruit, a group of radially arranged knives for dividing the fruit into segments, a guideway from the first-mentioned cutter to said group of knives, and means for effecting movement of the fruit from the first-mentioned cutter to position to be operated upon by said group of knives.

4. A machine of the character described, said machine having a group of radially arranged knives and also having a cutter for circumferentially effecting a cut in fruit, a guideway and means for causing the fruit to travel in a fixed path past said cutter, a movable member above the path of travel of the fruit, and means controlled by said movable member for determining the position of the circumferential cutter relatively to the path of travel of the fruit.

5. A machine for dividing fruit, said machine having a rotary cutter for circumferentially cutting the fruit on a bi-secting line, a corer, a group of radially arranged rotary knives for dividing the fruit on lines crossing its bi-secting cut, an intermittently rotatable series of fruit carriers for effecting movement of the fruit from the circumferential cutter to position to be cored and radially sliced, and means for actuating said carriers successively to insert the fruit in operative position relatively to said radially arranged knives.

6. A machine for dividing fruit, said machine having a rotary cutter for circumferentially cutting the fruit on a bi-secting line, a corer, a group of radially arranged rotary knives for dividing the fruit on lines crossing its bi-secting cut, means for automatically forcing fruit onto the corer and between said knives, and an intermittently rotatable series of fruit carriers for effecting movement of the fruit past the circumferential cutter for bi-secting the fruit and then to position to be forced onto said corer.

7. A machine for coring and slicing fruit, said machine having a group of rotary radially arranged knives spaced from each other, a corer in the center of the group, a series of fruit carriers intermittently movable successively to position above said knives and corer, means for individually actuating each of said carriers, upon its arrival in said position, to force the fruit onto the corer, and means cooperating with said carriers for forming a circumferential cut in the fruit on its way to said group of knives and corer.

8. A machine for dividing citrus fruit into transversely cut segments, said machine having a knife for forming an annular cut substantially at the equator of the fruit, knives for slicing the fruit in the general direction of the length of the segments thereof, a guideway from the first-mentioned knife to the knives which slice in the general direction of the length of the segments thereof, means for effecting movement of the fruit along said guideway, and means for successively pressing each fruit to operative position relatively to said slicing knives.

9. A machine for dividing citrus fruit into transversely cut segments, said machine having a group of radially arranged rotary knives, means for delivering fruits individually and successively to position to be cut by said knives, a rotary cutter for transversely cutting into each fruit to a distance adjacent to the core of the fruit while said fruit is on its way to said knives, means for causing the fruit to rotate while being transversely cut, and means for pressing each transversely cut fruit to position between said radially arranged knives.

10. A machine for dividing fruit, said machine having a rotary corer, a series of rotary knives surrounding the corer, a cutter for slicing the fruit transversely, a series of travelling impalers for conveying the fruit first to the transverse slicer and then to the corer and its surrounding knives, and means for actuating the impalers successively to press the fruit to operative position relatively to said corer and surrounding knives.

11. In a machine for coring and slicing fruit, a corer, a bushing surrounding the corer and having a series of recesses in its outer surface, and a circular series of slicers surrounding the corer and bushing with the inner edges of the slicers entering the recesses of the bushing.

12. In a machine for coring and slicing fruit, a group of radially arranged knives, a corer in the center of the group of knives, a corer loosely mounted on the corer and having external recesses into which the edges of the knives project, means for rotating the bushing, and means for causing fruit to be simultaneously operated upon by the corer and knives.

In testimony whereof I have affixed my signature.

CAROL FLOYD.